UNITED STATES PATENT OFFICE.

FERDINAND GERHARD WIECHMANN, OF NEW YORK, N. Y., ASSIGNOR TO FENOFORM CORPORATION, OF HASTINGS-UPON-HUDSON, NEW YORK, A CORPORATION OF NEW YORK.

PLASTIC MATERIAL.

1,135,340.  Specification of Letters Patent.  Patented Apr. 13, 1915.

No Drawing.  Application filed November 12, 1909.  Serial No. 527,585.

*To all whom it may concern:*

Be it known that I, FERDINAND GERHARD WIECHMANN, a citizen of the United States, residing at New York city, county and State of New York, have invented a Plastic Material, of which the following is a specification.

Dr. Leo H. Baekeland, in his English Patent No. 1,921, filed Jan. 28, 1908, describes how insoluble, infusible condensation products of phenol and formaldehyde may be used for the manufacture of plastic bodies, alone or in conjunction with filling materials. In order to improve the qualities of the objects made with it, or in order to facilitate the actions of molding, various filling materials have been proposed. But in general the filling materials recommended in such patent are chemically inert, and act about in the same way as crushed stone would act in cement concrete; namely, as a physical conglomerate.

I have found that vegetable proteins, and more particularly, vegetable ivory, (corozo), acts quite differently and makes a bond with the condensation product, which is much stronger, more homogeneous, and which is the result of a chemical action of the free phenol or phenolic body upon the vegetable protein.

I have found that vegetable proteins, in crushed condition, brought in contact with phenol, undergo a swelling action. In the same way, if pulverized vegetable proteins are mixed and added with phenols and formaldehyde in proper proportions, or with any partial condensation product of phenols and formaldehyde, which can be transformed into the final insoluble, infusible condensation products, then a similar action takes place. The result is, that in this instance, the binder and the filling material make a chemical bond, thus increasing and improving the homogeneity and strength, facilitating molding, polishing and in general, increasing considerably the technical value of the objects produced in this way.

In order to apply practically my invention, I may proceed in different ways.

Example 1: A mixture of about 50 parts of ground vegetable protein is heated with about 50 parts of commercial carbolic acid, and about 50 parts of commercial formaldehyde, to which about 8 parts of ammonia or any other suitable condensing (catalytic) agent is added. The mixture is heated, either in a closed vessel or in a return condenser, until the reaction is advanced so far that after cooling, the pasty mass becomes solid enough to grind. The material is then cooled and crushed or ground, and dried, after which it can be molded and shaped and submitted to the simultaneous action of heat and pressure, which will transform it into the final hard, insoluble, infusible product. The proportions of vegetable protein, carbolic acid or formaldehyde, can be changed in rather wide limits, according to the quality of the final substance which is desired.

Example 2: The vegetable protein, in ground condition, is mixed with one of the liquid or pasty forms of partial condensation products of phenols and formaldehyde. This paste is molded and heated under pressure as described above.

Example 3: The vegetable protein, in ground condition, is mixed with one of the liquid or pasty forms of partial condensation products of phenols and formaldehyde. Then the pasty mixture is submitted to further heating until on cooling it sets to a mass hard enough to allow crushing or grinding. When this point has been reached, the mass is cooled and dried, so as to free it from any excess of water. In order to facilitate this drying, or in order to make molding easier, the mass can be first submitted to grinding.

Example 4: Pulverized or ground vegetable protein is simply mixed with a pulverized solid partial condensation product of phenol and formaldehyde. The powdered mixture is then submitted to the action of heat and pressure until the partial condensation product has been transformed into the final hard infusible condensation product.

In all above examples, I may use vegetable protein alone or in conjunction with other suitable filling materials, or with coloring agents.

By the term vegetable proteid as used herein I mean such vegetable substances as, like ground vegetable ivory nut or corozo, are made up of the vegetable albumen or proteid still associated with its accompanying natural constituents of a non-proteid nature. Thus vegetable ivory is made up of the vegetable albumen or proteid together with a large amount of associated hemicellulose, the latter constituent being of a non-fibrous nature and being much more reactive chemically than the true fibrous cellulose. Vegetable ivory nut may contain up to 80% or more of this so-called hemicellulose. In its reaction with the phenol and formaldehyde or their product of reaction according to the present invention, the vegetable ivory enters into most intimate combination. There appears to be a true combination not only with the vegetable albumen or proteid itself, but also with the hemicellulose with which the vegetable proteid is most intimately associated.

My process and product differ from those described by Dr. Baekeland in his English patent above referred to, in that I use as a filler, a substance which is chemically acted upon during the carrying out of my process, and the products obtained have physical and chemical characteristics different from those existing in its original state. The combination of the vegetable proteid or vegetable ivory is a most intimate one. The vegetable ivory is not distributed throughout the mass as a filler but forms with the phenol and formaldehyde or the phenol-formaldehyde reaction product a practically homogeneous product, indicating a true chemical combination of the reacting materials.

Having thus described my invention, I claim:

1. As a new product of manufacture, a body containing an insoluble, infusible, condensation product of phenol and formaldehyde, in conjunction with a vegetable protein.

2. As a new product of manufacture, a body having a base of vegetable protein transformed into a practically insoluble and infusible body by the action of a condensation product derived from phenol and combining bodies, and the action of heat.

3. As a new product of manufacture, a body containing an infusible condensation product of phenol and formaldehyde, in conjunction with vegetable ivory.

4. As a new product of manufacture, a body having a base of vegetable ivory transformed into a practically insoluble and infusible body by the action of a condensation product of phenol and condensing agents.

In testimony whereof, I affix my signature, in the presence of two witnesses.

FERDINAND GERHARD WIECHMANN.

Witnesses:
ELIZABETH BARNETT,
W. A. TOWNER, Jr.